(12) United States Patent
Lee et al.

(10) Patent No.: US 12,260,568 B2
(45) Date of Patent: Mar. 25, 2025

(54) OPTIMAL AUTOMATIC MAPPING METHOD OF REAL IMAGE AND THERMAL IMAGE IN A BODY HEAT TESTER AND BODY HEAT TESTER APPLYING METHOD THEREOF

(71) Applicant: MESH CO., LTD., Wonju-si (KR)

(72) Inventors: Jung Hoon Lee, Wonju-si (KR); Joo Sung Lee, Wonju-si (KR); Hyun Chul Ko, Wonju-si (KR)

(73) Assignee: MESH CO., LTD., Wonju-si (KR)

( * ) Notice: Subject to any disclaimer, the term of this patent is extended or adjusted under 35 U.S.C. 154(b) by 501 days.

(21) Appl. No.: 17/534,241

(22) Filed: Nov. 23, 2021

(65) Prior Publication Data

US 2022/0172381 A1 Jun. 2, 2022

(30) Foreign Application Priority Data

Nov. 27, 2020 (KR) .................... 10-2020-0162528

(51) Int. Cl.
*G06T 7/30* (2017.01)
*G06T 7/11* (2017.01)
(Continued)

(52) U.S. Cl.
CPC .............. *G06T 7/30* (2017.01); *G06T 7/11* (2017.01); *G06T 7/13* (2017.01); *G06V 10/25* (2022.01); *G06T 2207/10048* (2013.01)

(58) Field of Classification Search
CPC ..... G06T 7/30; G06T 7/11; G06T 7/13; G06T 2207/10048; G06T 7/33; G06T 5/50;
(Continued)

(56) References Cited

U.S. PATENT DOCUMENTS

| 9,971,792 B2 * | 5/2018 | Solli ................. G06T 7/001 |
| 2011/0021944 A1 * | 1/2011 | Arnon .................. A61B 5/015 600/3 |

(Continued)

FOREIGN PATENT DOCUMENTS

| KR | 10-2016-0056023 A | 5/2016 |
| KR | 20200016508 A * | 2/2020 |
| WO | WO-2014100784 A1 * | 6/2014 ............. A61B 5/015 |

OTHER PUBLICATIONS

English translation of Method and Apparatus for Synthesizing Image, KR 20200016508 A. (Year: 2020).*

*Primary Examiner* — Manav Seth
(74) *Attorney, Agent, or Firm* — Rabin & Berdo, P.C.

(57) ABSTRACT

An optimal automatic mapping method between a real image and a thermal image in a body heat tester, and the body heat tester using the method. The real image from the real imaging camera has wider angle of view than the thermal image from the thermal imaging camera, to maximize the use of thermal imaging without omission of thermal imaging pixels in a thermal inspection device using an infrared imaging device. The body heat tester comprises a thermal imaging camera, a real imaging camera and a data processing unit. The data processing unit matches the thermal and real images, obtains the reconstructed real image matched with the thermal image by stretching or shortening the top, bottom, left, and right of the real image based on the thermal image, and detects the body heat (temperature) of the subject using the thermal image and the reconstructed real image.

10 Claims, 11 Drawing Sheets

(51) Int. Cl.
*G06T 7/13* (2017.01)
*G06V 10/25* (2022.01)

(58) Field of Classification Search
CPC ...... G06V 10/25; G06V 10/44; G06V 10/507; G06V 40/16; G06V 10/803; G06V 40/161; A61B 5/015; A61B 2562/0271; A61B 5/0077
See application file for complete search history.

(56) References Cited

U.S. PATENT DOCUMENTS

| | | | |
|---|---|---|---|
| 2014/0204217 A1* | 7/2014 | Sohn | G01J 5/0859 |
| | | | 348/164 |
| 2015/0334315 A1* | 11/2015 | Teich | H04N 25/674 |
| | | | 348/164 |
| 2016/0343118 A1* | 11/2016 | Olsen | G06T 5/92 |
| 2018/0271379 A1* | 9/2018 | Watanabe | A61B 5/01 |
| 2019/0162439 A1* | 5/2019 | Tsuda | F24F 11/62 |
| 2022/0015622 A1* | 1/2022 | Singh | G02C 7/04 |

\* cited by examiner

Index(X,Y, flag) , meanValue , maxValue, pX, pY
gapW = 640/16 = 40        gapH = 480/12 = 40

Background Region

BSA Region (a) Body Region-Of-Interest 1

(b) Body Region-Of-Interest 2

- Pixels that exceed the upper limit are lowered to have an area ratio of 3%

OPTIMAL AUTOMATIC MAPPING METHOD OF REAL IMAGE AND THERMAL IMAGE IN A BODY HEAT TESTER AND BODY HEAT TESTER APPLYING METHOD THEREOF

TECHNICAL FIELD

The present invention relates to an optimal automatic mapping method between a real image and a thermal image in a body heat tester, and the body heat tester using thereof method. The present invention can maximize the use of thermal images without omission of thermal image pixels in a thermal inspection device using an infrared imaging device. In order to obtain the most of the thermal image without missing pixels, the real image obtained from the real imaging camera (visual camera) should be wider angle of view than the thermal image obtained from the thermal imaging camera. In order to maximize the utilization of thermal image pixels without omission of thermal image pixels, the present invention reconstructs the real image by automatically stretching (expanding) or shortening the top, bottom, left and right of the real image, by applying the frame matching method that has the real image obtained from the real image camera wider angle of view than the thermal image obtained from the thermal image camera.

BACKGROUND ART

The thermal imaging camera is a camera that can measure the surface temperature of an object in a non-contact manner. The criterion for determining that a person has a fever through body temperature screening for specific infectious diseases is 37.3° C. In order to compare with a person with a normal body temperature of 36.5° C., the temperature should be expressed in 0.1° C. unit, and the temperature accuracy of 0.4° C. should be maintained at room temperature. These are requirements for operating a thermal imaging camera for medical purposes.

If these requirements are not satisfied, i.e., if the temperature accuracy is low, a febrile person may be judged as a normal person, or the opposite result may occur. Therefore, conventional thermal imaging cameras are operated as an accurate temperature reference point by additionally installing a blackbody source, as an additional device to increase the temperature accuracy.

In order to accurately identify and track a febrile person, a real imaging camera must be additionally used, and both real and thermal images of persons should be taken at the same time. In this case, it is essential to provide the same positional coordinate information when configuring the real and thermal image output screen.

In general, in temperature checks as a public screening tool, two or more heat sources should be detected at the same time, and moving objects should be analyzed and displayed in real time on the screen.

In addition, for infrared images, data based on temperature information is received, and in order to visualize the data, it is necessary to determine what color the corresponding temperature is expressed through the color-mapping technology. This is essential for diagnostic efficiency. For color mapping for the temperature range, mapping of the result should be done by analyzing histograms.

If a temperature screening product used for the public is composed of only a thermal imaging camera, there is a disadvantage that when there is a febrile person, it cannot easily distinguish the febrile person from normal persons or track the febrile person.

This is because black and white images or color-mapped images emphasize only the temperature difference, so it is not easy to distinguish facial characteristics and appearance. In order to solve this problem, the International Organization for Standardization has developed recommendations for fever screening that both the real and thermal images of persons should be taken at the same time. In this case, when the resolutions of the two images (real and thermal images) are different, or when the angle of view is different even if the resolution is the same, it may cause confusion for the user. In the case of displaying the measured temperature on the screen, there is no confusion in displaying the temperature value for the correct coordinates only when the location of the subject is the same. Therefore, a 1:1 mapping of real and thermal images is required for a temperature screening tool.

In general, there are three different types of temperature-measuring instruments. They include a method to measure the temperature value for all the temperatures that come into the screen, facial recognition at multiple zones, and a method to reduce errors (malfunctions) by measuring the temperature value distinguishing different temperatures for the background, objects and persons entering or exiting. In the case of using facial recognition, there is a problem that it is not possible to accurately determine the number of persons entering and exiting according to the image detection accuracy. In particular, the subject must look straight at the camera, and wearing a face mask or the influence of accessories such as a hat acts as a disadvantage to the detection capability. In addition, an ideal location for the accurate temperature measurement is at a point where the artery passes such as the eye canthus and temple areas of the face, and where the carotid artery passes on the neck and the skin. These areas are where the exact body temperature can be measured. Since facial recognition excludes these positions, including the side or back view of the subject, there is a limit to measuring body temperature accurately. So multi-region body temperature detection is a method to compensate for the disadvantages of facial recognition.

In the present invention, thermal image pixels are used to the maximum without the omission of pixel values. In order to do so, the real imaging automatically is obtained a wider-angle than the thermal imaging, by applying the frame matching method that the top, bottom, left and right of a real image can be stretched or shortened automatically. The present invention proposes the optimal automatic mapping method of real and thermal images of a body heat tester using an infrared imaging device and the body heat tester applying thereof method to maximize utilization of thermal image pixels without the omission of pixel values.

In the present invention, the body heat tester, stores six real image frames each at the time before and after of thermal image frames in the memory unit, based on thermal image frames; selects the real image frame having the maximum matching rate among the saved real image frames; detects boundaries of the subject in the thermal image frame and the selected real image frame; and matches the thermal image frame with the results of expanding (stretching) and reducing (shortening) the selected real image frame by 1 pixel in each direction of top, bottom, left, and right to select the point with the maximum matching rate. By doing this, it is possible to obtain the result of an optimized mapping in all directions.

As a prior art, the Korea Patent Publication No. 10-2016-0056023 "An apparatus for providing thermal images using a thermopile array sensor and a real imaging cameral, and methods of using thereof" describes the creation of a high-resolution thermal image of the subject by matching a thermal image to a high-resolution real image based on the characteristics of the analyzed thermal distribution and high-resolution real image.

However, the Korea Patent Publication No. 10-2016-0056023, does not have the technology like the present invention that detects boundaries of the subject (real and thermal images); matches the boundaries stretched and shortened results by 1 pixel in each direction; compares the matching rates; re-executes the same process to find the point with the maximum matching rate; and consequently makes full use of the thermal image without missing thermal image pixels.

DISCLOSURE

Technical Problem

The agenda that the present invention aims to solve is to provide an optimal automatic mapping method between a real image and a thermal image in a body heat tester, and the body heat tester using the method, wherein the real image from the real imaging camera (visual camera) has wider angle of view than the thermal image from the thermal imaging camera, to maximize the use of thermal imaging without omission of thermal imaging pixels in a thermal inspection device using an infrared imaging device.

Another agenda that the present invention aims to solve is to provide an optimal automatic mapping method between a real image and a thermal image in a body heat tester, and the body heat tester using the method, wherein store six real image frames each at the time before and after of thermal image frames in the memory unit, based on thermal image frames; select the real image frame having the maximum matching rate among the saved real image frames; detect boundaries of the subject in the thermal image frame and the selected real image frame; and matches the thermal image frame with the results of expanding (stretching) and reducing (shortening) the selected real image frame by 1 pixel in each direction of top, bottom, left, and right to select the point with the maximum matching rate.

Solution to Problem

To solve the problem and achieve the objectives described above, the body heat tester of the present invention is characterized with the real and thermal image mapping unit. The body heat tester comprises a thermal imaging camera for taking thermal images of an area with a plurality of subjects; a real imaging camera for taking real images of an area with a plurality of subjects at the same time with a thermal camera; and a data processing unit.

The data processing unit that performs operations as follows: matching the thermal and real images received from the thermal and real imaging cameras; obtaining the reconstructed real image matched with the thermal image by stretching or shortening the top, bottom, left, and right of the real image based on the thermal image; and detecting the body heat (temperature) of the subject using the thermal image and the reconstructed real image.

The data processing unit stores six real image frames each at the time before and after of thermal image frames in the memory unit based on thermal image frames; selects the real image frame having the maximum matching rate with the thermal image among the saved real image frames; and detects boundaries of the subject in the thermal image frame and the selected real image frame. Then it matches the thermal image frame with the results of expanding (stretching) and reducing (shortening the selected real image frame by 1 pixel in each direction of top, bottom, left, and right to select the point with the maximum matching rate.

The real and thermal image matching unit inverts the real image screen and the thermal image screen for edge detection; compares the thermal image profiles on the horizontal axis in the inverted, predetermined thermal image and the real image profiles on the horizontal axis in the inverted real image; obtains the real image profiles on the horizontal axis closest to thermal image profiles on the horizontal axis as reconstructed real image profiles on the horizontal axis; compares the thermal image profiles on the vertical axis in the inverted predetermined thermal image and the real image profiles on the vertical axis in the inverted real image; obtains the real image profiles on the vertical axis closest to thermal image profiles on the vertical axis as reconstructed real image profiles on the vertical axis; calculates the ratio and delta (position) of the obtained real image profiles (horizontal and vertical); adjusts the ratio and position of the real image with the ratio and delta value of the real image profiles (horizontal and vertical); stores the adjusted real image as a reconstructed real image in the memory unit; and outputs it to the display unit.

In addition, the data processing unit further comprises a multi-region body temperature detection unit. The multi-region body temperature detection unit divides the thermal image and the reconstructed real image into a preset horizontal number×vertical number; obtains the overall mean value from Region of Interest (ROI) which is the split region of the thermal image; excludes the split region in which the maximum value of each split region in the thermal image is less than the overall mean value from the ROI; excludes regions in which the maximum value of each split region of the thermal image exceeds the preset threshold temperature from the ROI; compares the maximum value from ROI adjacent region; excludes the remaining adjacent regions from the ROI leaving out only the split region with the largest maximum value among the adjacent regions; calculate the coordinates of the remaining ROI (i.e., XY coordinates) and the maximum temperature of the corresponding ROI; and displays the calculated maximum temperature on the thermal and real images at the coordinates of the corresponding ROI.

The data processing unit also includes a win-level auto adjusting unit. The win-level auto adjusting unit calculates a histogram from the thermal image; detects the background peak (with the peak value higher than the reference value of preset background peak) in the histogram; detects the body surface area (BSA) peak (with the peak value lower than the reference value of the preset BSA peak) in the histogram; sets the point at which the maximum temperature region becomes 3% of the total thermal image area as the upper limit value, which is the maximum expressed temperature; sets the split point where the background and the BSA intersect as the minimum point, the lower limit; performs pseudo-coloring on the BSA in the histogram by creating color mapping data using the lower and upper limits; and outputs the obtained pseudo-coloring image to the display unit.

Another feature of the present invention is the method of operating the body heat tester including a thermal and real image cameras for simultaneously detecting body heat of a plurality of subjects. The method of operating the body heat tester comprises: the data processing unit matches the thermal image received from the thermal imaging camera and the real image received from the real imaging camera; based on the thermal image, the reconstructed real image matched with the thermal image is obtained by stretching or shortening the top, bottom, left, and right of the real image; and the body heat (body temperature) of the subject is detected using a thermal image and a reconstructed real image.

In order to obtain a reconstructed real image, the data processing unit imports six real image frames acquired at the time before/after thermal image frames from the memory unit based on the thermal image frame; selects the real image frame with the maximum matching rate with the thermal image frame among the real image frames; detects boundaries of the subject in each of the thermal image frame and the selected real image frame; matches the thermal image frame with the results of expanding (stretching) and reducing (shortening) the selected real image frame by 1 pixel in each direction of top, bottom, left and right; and selects the point with the maximum matching rate.

In order to match the thermal and real images, the method of operating the body heat tester includes a screen inversion step, a horizontal axis matching rate detection step, a step of comparison with the maximum matching value of the horizontal axis, a step of comparison with the maximum matching value of the vertical axis, a step of storing matching data of the horizontal and vertical axis, and a real image adjustment step. In the screen inversion step, the data processing unit inverts the real and thermal image screens for edge detection by the data processing unit. In the horizontal axis matching rate detection step, the data processing unit obtains a horizontal axis matching rate by comparing the horizontal axis thermal image profiles in the predetermined thermal image inverted in the screen inversion step with the real image profiles along the horizontal axis in the inverted real image in the screen inversion step. In the step of comparison with the maximum matching value of the horizontal axis, the data processing unit, compares the horizontal axis matching rate with a pre-stored maximum matching rate value of the horizontal axis; and imports the next horizontal axis real image profile of the inverted real image from the screen inversion step, from the memory unit if the horizontal axis matching rate is not equal to the maximum matching rate value of the horizontal axis, and returns to the horizontal axis matching rate detection step. In the vertical axis matching rate detection step, the data processing unit, obtains a vertical axis matching rate by comparing the vertical axis thermal image profiles in the predetermined thermal image inverted in the screen inversion step with the real image profiles along the vertical axis in the inverted real image in the screen inversion step. In the step of comparison with the maximum matching value of the vertical axis, the data processing unit performs the following: compares the vertical axis matching rate with a pre-stored maximum matching rate value of the vertical axis; and imports the next vertical axis real image profile of the inverted real image from the screen inversion step, from the memory unit if the vertical axis matching rate is not equal to the maximum matching rate value of the vertical axis, and returns to the vertical axis matching rate detection step. In the step of storing matching data of the horizontal and vertical axis, the data processing unit, uses the horizontal axis real image profile as the horizontal axis real image profile for reconstruction if the horizontal axis matching rate is equal to the maximum matching value of the horizontal axis in the step of comparison with the maximum matching value of the horizontal axis; uses the vertical axis real image profile as the vertical axis real image profile for reconstruction if the vertical axis matching rate is equal to the maximum matching rate value of the vertical axis in the step of comparison with the maximum matching value of the vertical axis; and obtains the ratio and position (delta) of the horizontal axis real image profile for reconstruction and the vertical axis real image profile for reconstruction, and stores the ratio and position (delta) in the memory unit. In the real image adjustment step, the data processing unit adjusts position and ratio of the vertical and horizontal real image profiles with the ratio and delta value of the vertical and horizontal real image profiles for reconstruction; saves the adjusted real image as a reconstructed real image in the memory unit; and outputs it to the display unit.

In order to detect the body heat of subjects, the method of operating the body heat tester includes a region segmentation step, an outermost region exclusion step, a mean value detection step, a maximum value comparison step, an adjacent region comparison step, a maximum temperature detection step and a step of displaying the corresponding value on the image. In the region segmentation step, the data processing unit divides the region of the thermal image on the screen into a preset horizontal number (number of horizontal dividing lines)×vertical number (number of vertical dividing lines), and sets the split regions as ROIs. In the outermost region exclusion step, the data processing unit excludes the outermost regions in each divided area in the region segmentation step. In the mean value detection step, the data processing unit calculates the mean value of the thermal image in all regions of the thermal image divided in the region segmentation step. In the maximum value comparison step, the data processing unit compares the maximum value of the thermal image region divided in the region segmentation step with the mean value detected in the mean value detection step, and excludes a region which the maximum value is less than the mean value from the ROI. In the adjacent region comparison step, the data processing unit compares the maximum value between adjacent regions interconnected in the ROI, and leaves only the region with largest maximum value and excluding the remaining adjacent regions from the ROI. In the maximum temperature detection step, the data processing unit takes the remaining ROIs as the final ROIs after going through the adjacent region comparison step, and calculates the coordinates (i.e., XY coordinates) and the maximum temperature of the final ROIs. In the step of displaying the corresponding value on the image, the data processing unit displays the maximum temperature of the final ROIs detected in the maximum temperature detection step on the thermal and real images of the coordinates of the final ROIs.

In addition, the method of operating the body heat tester includes a histogram calculation step, a background peak detection step, a BSA peak detection step, a lower and upper limit value set step, and a pseudo coloring step. In the histogram calculation step, the data processing unit calculates a histogram from the thermal image. In the background peak detection step, the data processing unit detects the background peak in the histogram, wherein detects the background peak value higher than a preset background peak reference value. In the BSA peak detection step, the data processing unit detects a BSA peak in the histogram, wherein detects the peak value lower than the preset BSA peak reference value. In the lower and upper limit value set step, the data processing unit calculates the point at which the maximum temperature region becomes 3% of the total area of the thermal image as the maximum expression temperature, the upper limit value, and the point where the background and the BSA intersect as the minimum point, the lower limit value. In the pseudo coloring step, the data processing unit creates color mapping data using the lower limit and upper limit values obtained in the lower and upper limit value set step, performs pseudo-coloring on the BSA in the histogram, and outputs the obtained pseudo-coloring image to the display unit.

The horizontal axis matching rate in the horizontal axis matching rate detection step is the absolute value of the value obtained by subtracting the length of the thermal image profile and the length of real image profile on the horizontal axis. The vertical axis matching rate in the vertical axis matching rate detection step is the absolute value of the value obtained by subtracting the length of the thermal image profile and the length of real image profile on the vertical axis. The maximum matching value of the horizontal and vertical axes may be 0.

Advantageous Effects

In the present invention, the optimal automatic mapping method between a real image and a thermal image in a body heat tester, and the body heat tester using the method, maximize the use of thermal imaging without omission of thermal imaging pixels in a thermal inspection device using an infrared imaging device, since the real image from the real imaging camera (visual camera) has wider angle of view than the thermal image from the thermal imaging camera. By doing so, errors can be reduced and the accuracy can be increased.

The present invention, stores six real image frames each at the time before and after of thermal image frames in the memory unit, based on thermal image frames; select the real image frame having the maximum matching rate among the saved real image frames; detect boundaries of the subject in the thermal image frame and the selected real image frame; and matches the thermal image frame with the results of expanding (stretching) and reducing (shortening) the selected real image frame by 1 pixel in each direction of top, bottom, left, and right to select the point with the maximum matching rate. The present invention repeats the process of comparing matching rates several times to set the point with the maximum matching rate, wherein it repeats 4 times in the up, down, left, and right directions, allowing it to be set as a result of the optimized mapping in all directions.

DETAILED DESCRIPTION OF THE INVENTION

The body heat tester of the present invention's optimal automatic mapping method of real and thermal images in a body heat tester and the body heater applying thereof method will be described in detail below with reference to the attached drawings.

Figure 1:
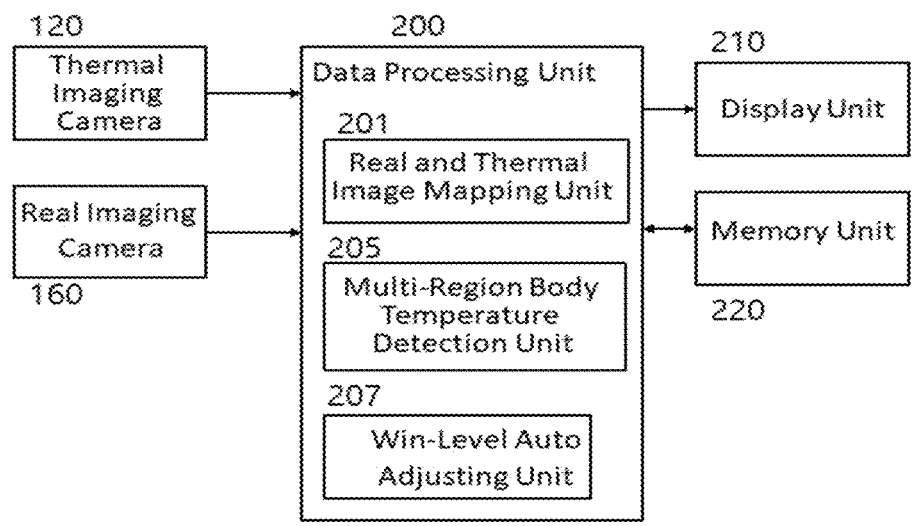
FIG. 1 is a block diagram showing a schematic configuration of a body heat tester of the present invention.

FIG. 1 is a block diagram showing a schematic configuration of the body heat tester of the present invention.

The thermal image detected by the (infrared) thermal imaging camera (120) and the real image detected by the (general-purpose) real imaging camera (160) are transmitted to the data processing unit (200). In other words, the thermal and real images taken at the same time are transmitted to the data processing unit (200).

The data processing unit (200) includes the real and thermal image mapping unit (201), the multi-region body temperature detection unit (205), and the win-level auto adjusting unit (207).

The real and thermal image mapping unit (201) of the data processing unit (200) stores six before/after real image frames based on the thermal image frame in the memory unit (220), and then selects the real image frame that has the maximum matching rate with the thermal image frame. Boundaries of the subject in the thermal image frame and the real image frame selected in this way are detected. The thermal image frame and the selected real image frame, are matched by expanding and reducing them by 1 pixel in each direction of the up, down, left, and right to select the point with the maximum matching rate. This process is repeated several times, so that the point having the highest selected matching rate is set. This process is repeated four times in the up, down, left, and right directions. Then, it is fixed as a result of the mapping optimized in all directions of up, down, left, and right.

Accordingly, the data processing unit (200) can obtain a wider-angle real image than the thermal image. As the results, without omission of the thermal image pixel values, the multi-region body temperature detection unit (205) detects the body heat (body temperature) of a plurality of subjects using the thermal image. The win-level auto adjusting unit (207) performs pseudo-coloring on the BSA, and outputs the body heat image and temperature value to the display unit (210).

The present invention's body heat tester's optimal automatic mapping method of real and thermal images will be described in detail below.

<1:1 Mapping Method of Real and Thermal Images>

This is operated by the real and thermal image mapping unit (201) of the data processing unit (200).

In order to maximize the use of the thermal image without the omission of pixel values, the real imaging from the real imaging camera should be obtained to have a wider angle than the thermal imaging from the thermal imaging camera. To this end, in the present invention, the data processing unit (200) has the functions of stretching (expanding) and shortening (reducing) real images up (top), down (bottom), left, and right directions.

This is done through automation of tasks, and the frame matching method is applied.

The data processing unit (200) stores six real image frames each at the time before/after the thermal image frame based on the thermal image frame, in the memory unit (220), selects the real image frame that has the maximum matching rate with the thermal image frame in these real image frames, and detects boundaries of the subject in the selected real image frame and the thermal image frame.

The thermal image frame are matched with the results of expanding or reducing the selected real image frame by 1 pixel in each direction of top, bottom, left, and right, and the matching rates are compared. The same process is re-executed to find and fixate the real image frame and the thermal image frame with the point with the maximum matching rate. The same process is repeated four times in each direction of top, bottom, left, and right to find and set the optimized mapping results in all directions.

Figure 2:
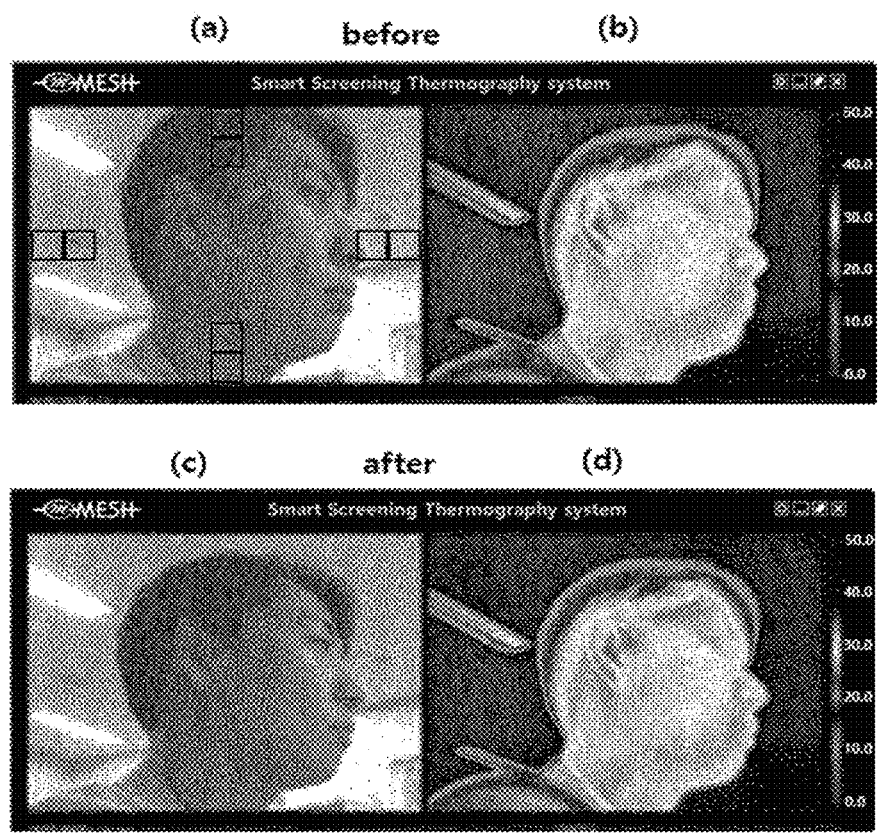
FIG. 2 shows sample images before and after applying the frame matching method of the present invention.

FIG. 2 illustrates before and after applying the frame matching method of the present invention. FIGS. 2 (a) and (b) shows real and thermal images before applying the frame matching method of the present invention, and FIGS. 2 (c) and (d) shows real and thermal images after applying the frame matching method of the present invention.

It be seen that the matching rate of the real and thermal images after the application of the present invention is significantly improved compared to the images before the application of the present invention, and the real images have been stretched or shortened.

Figure 3:
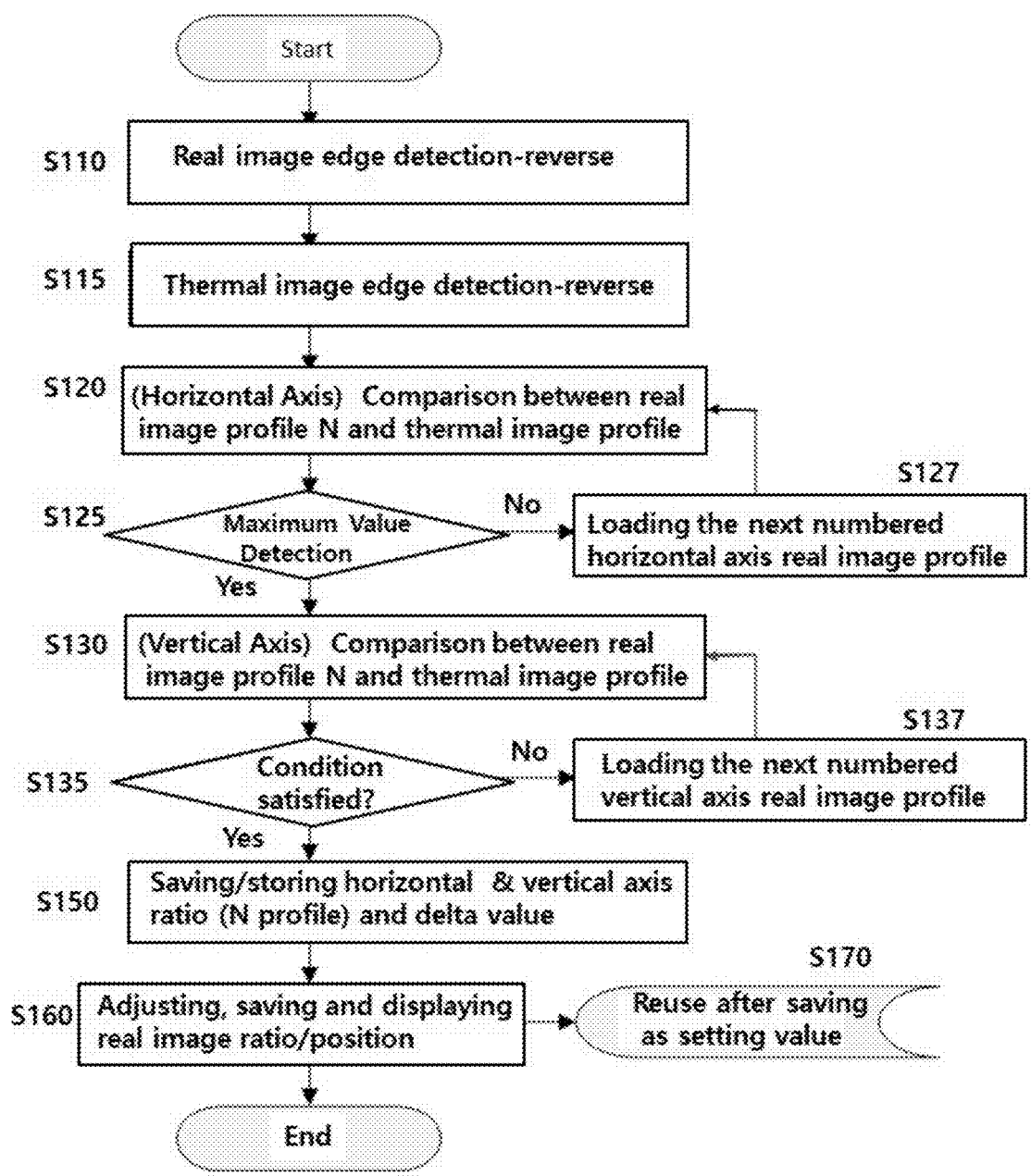
FIG. 3 is a flowchart schematically illustrating an optimal automatic mapping method of real and thermal images of the body heat tester of the present invention.

FIG. 3 is a flowchart schematically illustrating the optimal automatic mapping method of real and thermal images in the body heat tester of the present invention.

In the screen inversion step, the data processing unit (200) performs the inversion (S110) of the real image screen for edge detection on the real image screen, and the inversion (S115) of the thermal image screen for edge detection on the thermal image screen.

In the horizontal axis matching rate detection step, the data processing unit (200) compares the preset thermal image profile (on the horizontal axis) in the inverted thermal image in the screen inversion step with real image profile (i.e., it can be referred to as nth real image profile on the horizontal axis because the real image profiles on the horizontal axis are compared in order) on the horizontal axis in the inverted real image in the screen inversion step to obtain the horizontal axis matching rate (S120). Here, an absolute value of the value obtained by subtracting the length of the preset thermal image profile and the length of the real image profile on the horizontal axis can be obtained as the horizontal axis matching rate (the value indicating the matching degree of the horizontal axis).

In the step of comparison with the maximum matching value of the horizontal axis, the data processing unit (200) compares the horizontal axis matching rate detected in the horizontal axis matching rate detection step with a previously stored maximum matching value (i.e., the maximum matching rate value) on the horizontal axis (S125). If the horizontal axis matching rate is less than or not equal to the maximum matching value of the horizontal axis, maximum matching value of the horizontal axis has not been detected. Then the next (i.e., the N+1th) real image profile on the horizontal axis from the inverted real image in the screen inversion step is imported from the memory unit (S127) before going to the horizontal axis matching rate detection step. Here, the maximum matching value of the horizontal axis may be 0.

That is, in the horizontal axis matching rate detection step and the step of comparison with the maximum matching value of the horizontal axis, the results of the profile analysis for the edge of the real image on the horizontal axis are compared with the values of the profile analysis for the edge of the thermal image. This process is repeated to find the maximum matching value of the horizontal axis.

In the vertical axis matching rate detection step, the data processing unit (200) compares the preset thermal image profile (on the vertical axis) in the inverted thermal image in the screen inversion step with real image profile (i.e., it can be referred to as nth real image profile on the vertical axis because the real image profiles on the vertical axis are compared in order.) on the vertical axis in the inverted real image in the screen inversion step to obtain the vertical axis matching rate (S130). Here, an absolute value of the value obtained by subtracting the length of the preset thermal image profile and the length of the real image profile on the vertical axis can be obtained as the vertical axis matching rate (the value indicating the matching degree of the vertical axis).

In the step of comparison with the maximum matching value of the vertical axis, the data processing unit (200) compares the vertical axis matching rate detected in the vertical axis matching rate detection step with a previously stored maximum matching value (i.e., the maximum matching rate value) on the vertical axis (S135). If the vertical axis matching rate is less than or not equal to the maximum matching value of the vertical axis, maximum matching value of the vertical axis has not been detected. Then the next (i.e., the N+1th) real image profile on the vertical axis from the inverted real image in the screen inversion step is imported from the memory unit (S137) before going to the vertical axis matching rate detection step. Here, the maximum matching value of the vertical axis may be 0.

In the step of storing matching data on the horizontal and vertical sides, if the horizontal axis matching rate is equal or less than the maximum matching value of the horizontal axis in the step of comparison with the maximum matching value of the horizontal axis, the maximum matching value on the horizontal axis is detected. The real image profile on the horizontal axis at this time is stored in the memory unit (220) as the horizontal axis real image profile (i.e., the horizontal axis real image profile for reconstruction) at the time of maximum matching with the preset thermal image profile. If the vertical axis matching rate is equal or less than the maximum matching value of the vertical axis in the step of comparison with the maximum matching value of the vertical axis, the maximum matching value on the vertical axis is detected. The real image profile on the vertical axis at this time is stored in the memory unit (220) as the vertical axis real image profile (i.e., the vertical axis real image profile for reconstruction) at the time of maximum matching with the preset thermal image profile. The ratio and delta values of the horizontal axis real image profile at the time of maximum matching and the vertical axis real image profile at the time of maximum matching are stored in the memory unit (220) (S150).

For example, when the matching rates are the same as the maximum matching value, and thus the preset thermal image profile and the length of nth real image profile match, this nth profile is stored in the memory unit (220). The horizontal axis real image profile and the ratio and delta values of the vertical axis real image profile at that time are stored in the memory unit (220).

In the real image adjustment step, the ratio and position of the real image are adjusted using the ratio and delta values of the real image profiles of horizontal and vertical axes obtained in the step of storing matching data on the horizontal and vertical sides. The adjusted real images are stored in the memory unit (220) and output to the display unit (210). Here, the position (delta) may represent a distance between a preset thermal image profile and a real image profile on the horizontal axis.

After the real image adjustment step, the step of saving set values may be further comprised.

In the step of saving set values, the ratio and delta values of real image profiles on the horizontal and vertical axes (for reconstruction) are stored as set values. The set values can be used later to adjust real images.

Figure 4:
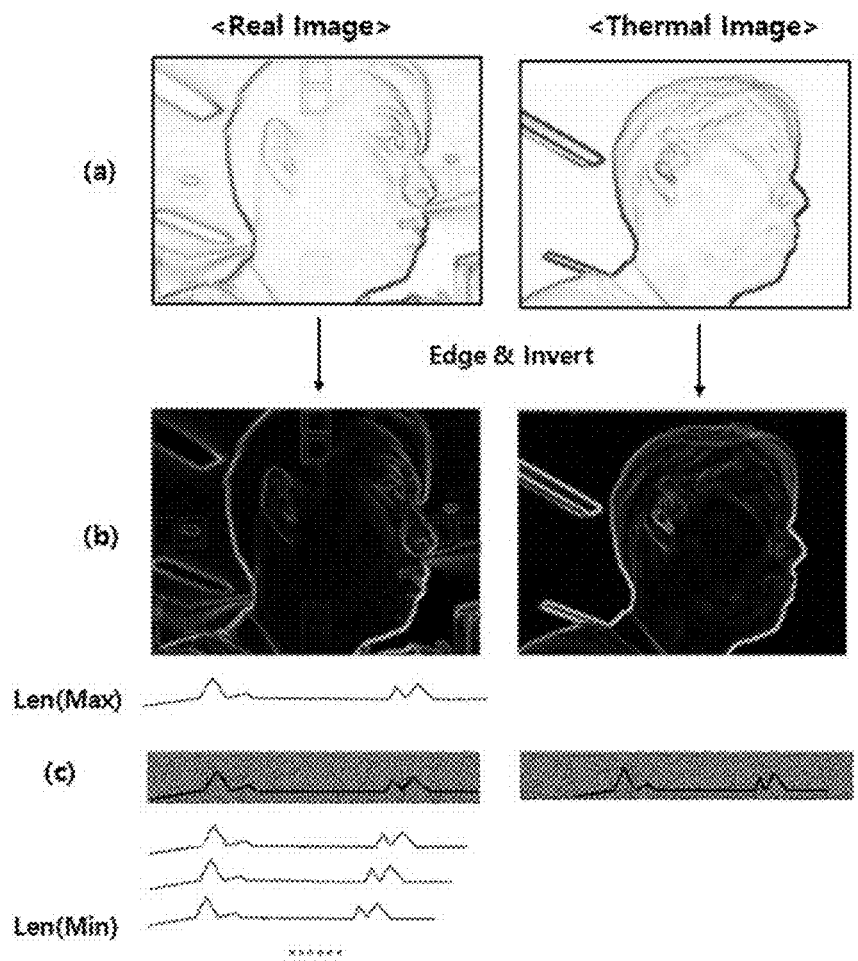
FIG. 4 is an explanatory diagram illustrating the matching rate detection step and the step of comparison with maximum matching value in the flowchart of FIG. 3.
Figure 5:
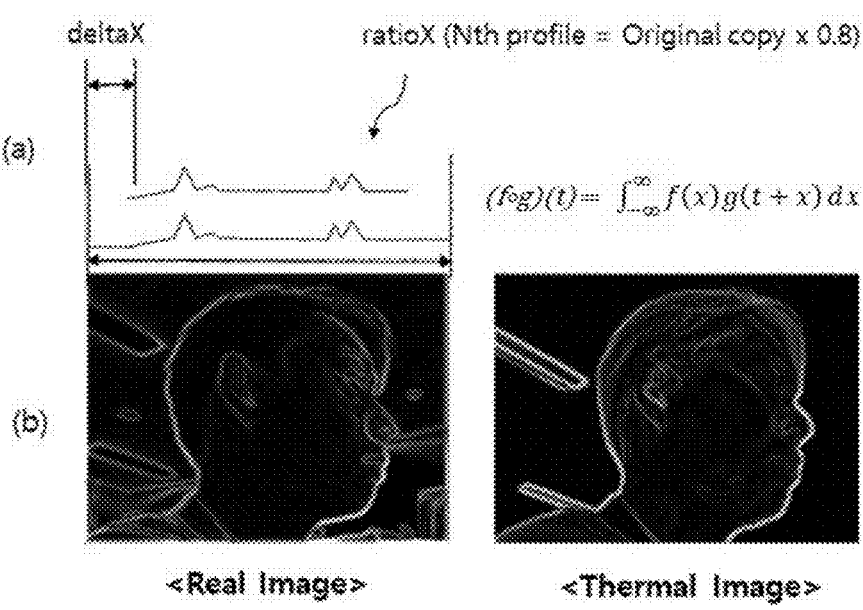
FIG. 5 is an explanatory diagram for illustrating the real image adjustment step in the flowchart of FIG. 3.

FIG. 4 is an explanatory diagram illustrating the matching rate detection step and the step of comparison with the maximum matching value in the flowchart of FIG. 3. The FIG. 5 is an explanatory diagram for illustrating the real image adjustment step in the flowchart of FIG. 3.

FIG. 4 (*a*) shows an example of real and thermal images before the screen inversion step.

FIG. 4(*b*) shows the results of the real and thermal images of FIG. 4 (*a*) after the screen inversion step.

FIG. 4(*c*) shows the comparison of real and thermal image profiles (the gray square part of FIG. 4 (*c*)) and the selection of the real image profile (Len(Max) of FIG. 4 (*c*)) same as the thermal image profile in the matching rate detection step and the step of comparison with the maximum matching value.

FIG. 5(*a*) is a diagram for illustrating the real image adjustment step. Real images are adjusted by using the ratio and delta values of real image profiles of horizontal axes (real horizontal image profiles) and real image profiles of the vertical axis (real vertical image profiles) saved in the step of storing matching data on the horizontal and vertical sides of the flow chart of FIG. 3.

FIG. 5(*b*) shows the real and thermal images of FIG. 4(*b*) after the real image adjustment step.

<Multi-Region Body Temperature Detection>

This is detected by the multi-region body temperature detection unit (205) of the data processing unit (200).

The thermal image screen is split to be a preset horizontal number×vertical number (e.g., 4×3 or 8×6). A split region that the pixel value is larger than a preset value (e.g., the overall average) in each split regions, is detected as the maximum point (peak, i.e., maximum point of the split region). When the peak exceeds a preset threshold temperature (e.g., 40° C.), the split region with the peak that exceeds the threshold temperature, is excluded from the ROI. Then, at the split regions that are not excluded, the peaks of adjacent split regions (i.e., split regions connected to each other) are compared with each other, and a split region having a small peak (i.e., local peak) among them is excluded. The temperature value of the maximum point of each split regions, obtained in this way, is displayed in the corresponding part of the real image and the thermal image.

Figure 6:
FIG. 6 shows an example of detecting and displaying body temperature by the multi-region body temperature detection method of the present invention.

FIG. 6 is an example of detecting and displaying body temperature by the multi-region body temperature detection method of the present invention.

Body temperature values detected for each person are displayed in real and thermal images, respectively.

Figure 7:
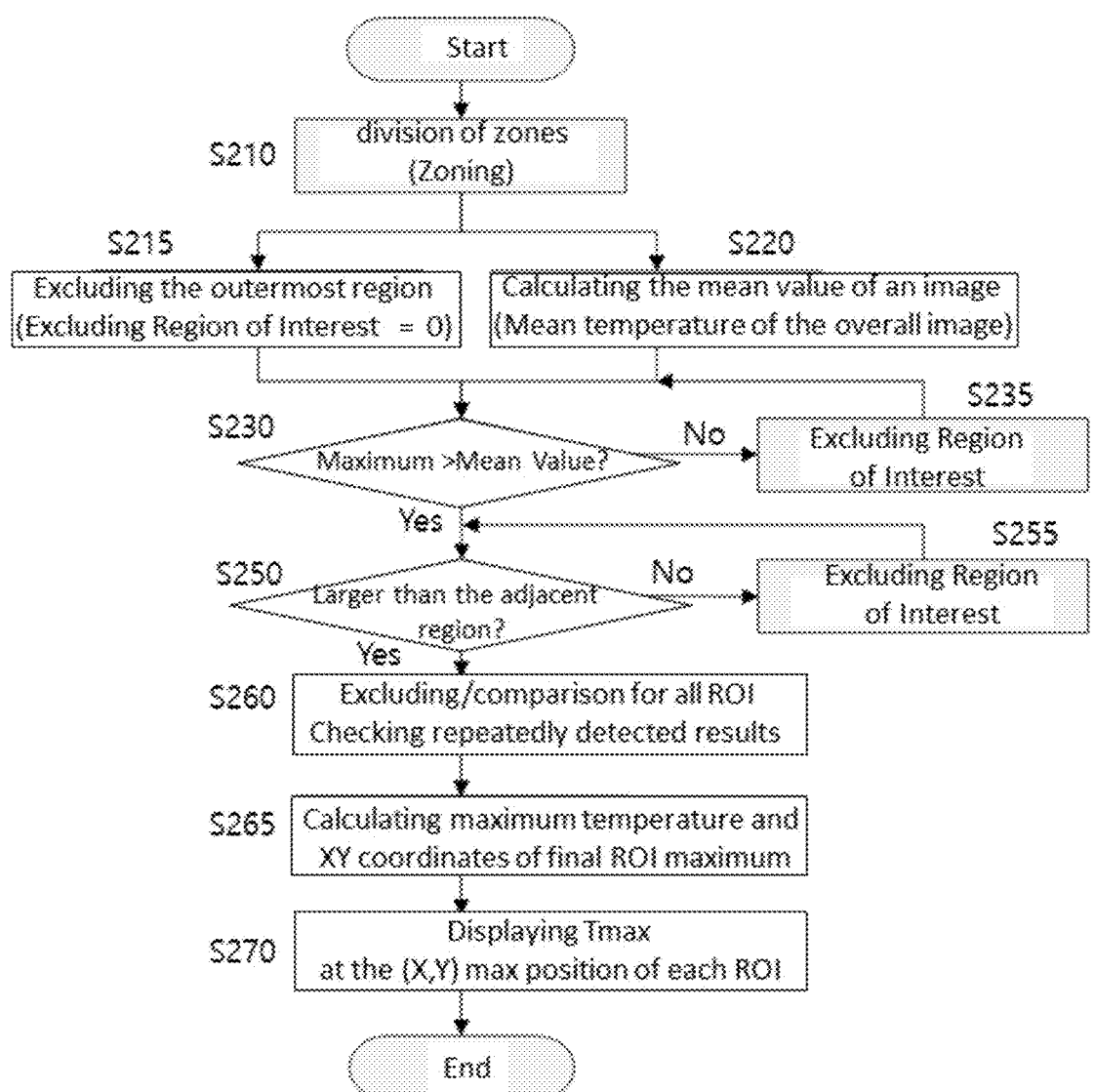
FIG. 7 is a flowchart illustrating an example of the method of detecting a multi-region body temperature according to the present invention.
Figure 8:
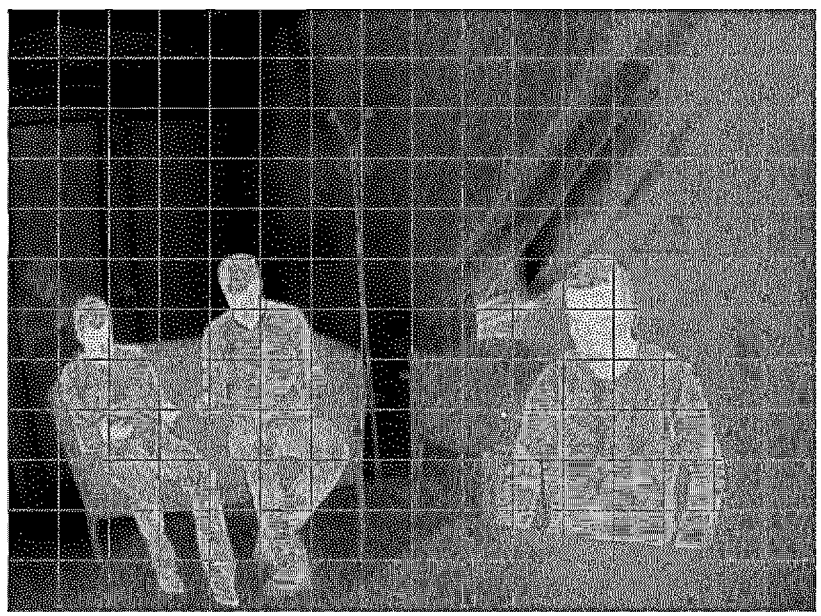
FIG. 8 shows sample images obtained after the region segmentation step of FIG. 7.
Figure 9:
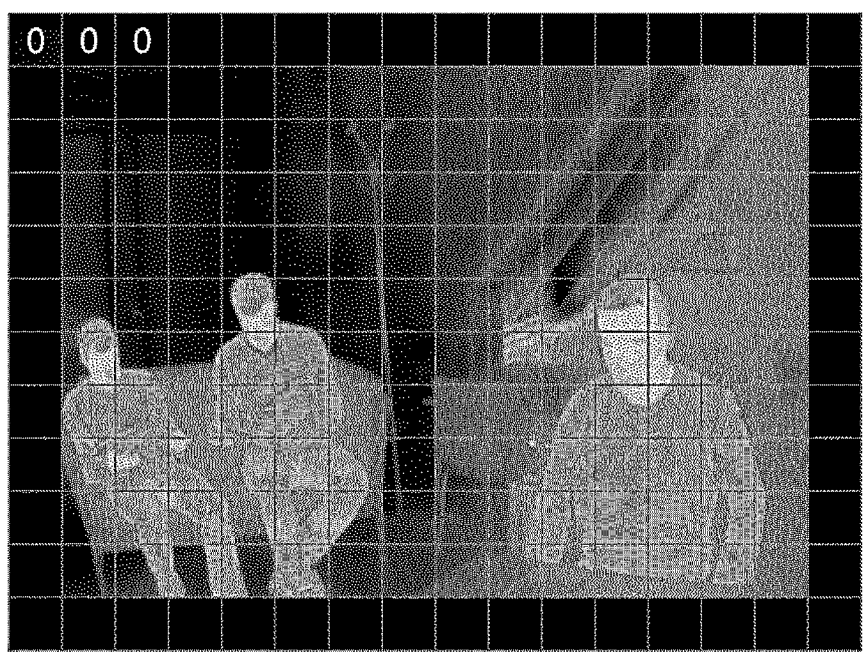
FIG. 9 shows the image as a result applying the images of FIG. 8 to the outermost region exclusion step.
Figure 10:
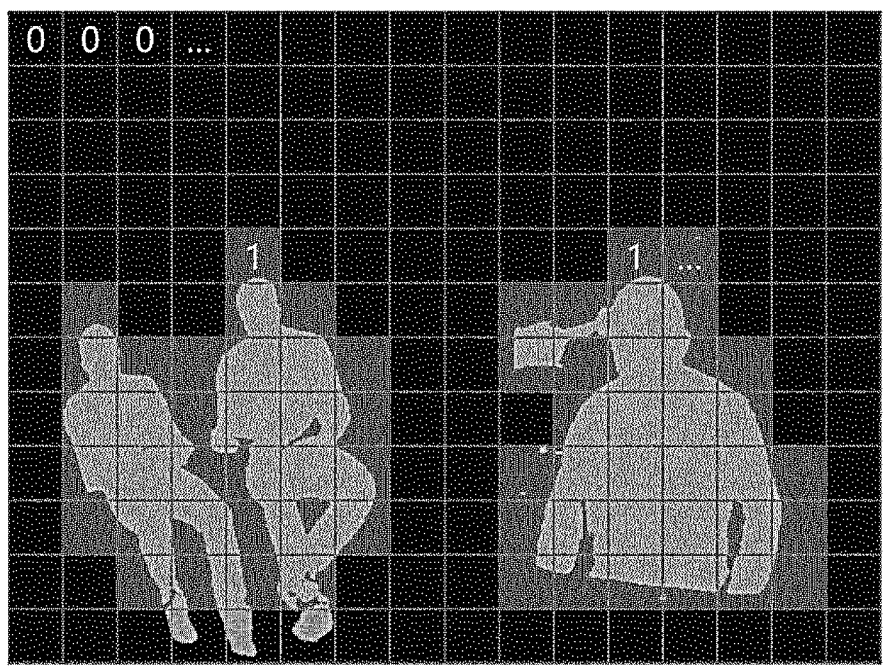
FIG. 10 shows the image as a result applying the images of FIG. 9 to the maximum value comparison step.
Figure 11:
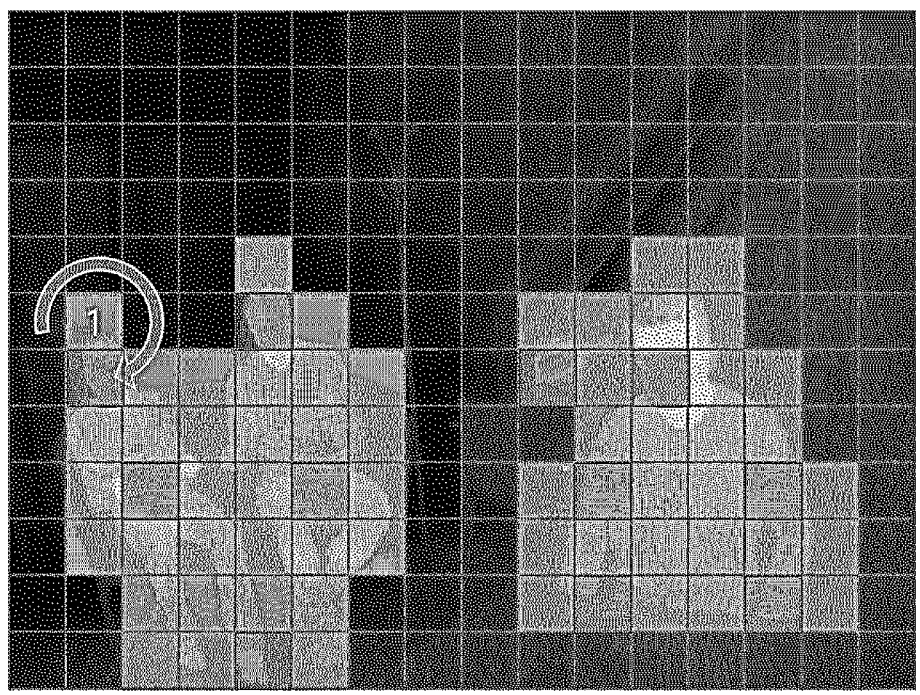
FIG. 11 shows the image as a result applying the images of FIG. 10 to the adjacent region comparison step.

FIG. 7 is a flowchart illustrating an example of the multi-region body temperature detection method of the present invention. FIG. 8 shows sample images of FIG. 7 after the region segmentation step. FIG. 9 show the image of FIG. 8 after the outermost region exclusion step. FIG. 10 shows the image of FIG. 9 after the maximum value comparison step. FIG. 11 shows the image of FIG. 10 after the adjacent region comparison step.

In the region segmentation step, the data processing unit (200) splits the thermal image screen to be a preset horizontal number×vertical number (e.g., 4×3 or 8×6) (S210). Sample images after the region segmentation step is shown in FIG. 8.

In the outermost region exclusion step (S215), an outermost region is excluded among each split regions divided in the region segmentation step. That is, the values of the outermost regions are set to "0", and the outermost region is excluded from the ROI. FIG. 9 shows the image as a result applying the images of FIG. 8 to the outermost region exclusion step.

In the mean value detection step, the data processing unit (200) obtains the mean value of the thermal image (the mean temperature of split regions) in all regions (i.e., all split regions) of split thermal image in the region segmentation step (S220).

In the maximum value comparison step, the data processing unit (200) compares (S230) the maximum value of each split region with the mean value detected in the mean value detection step. If the maximum value is smaller than the mean value, the split region is excluded (S235) from the ROI. In this way, the regions with the mean value smaller than the maximum value in all split regions are excluded from the ROI less than the maximum value in all split regions is excluded from the ROI. In the image of FIG. 9, the images of a case in which the region is excluded from the ROI in the maximum value comparison step because the maximum value of the region is smaller than the mean value are shown in FIG. 10. For convenience of explanation, hereinafter 'split region' is referred to as 'region'.

In some cases, a threshold temperature comparison step (not shown) may be further comprised between the maximum value comparison step and the adjacent region comparison step.

In the threshold temperature comparison step (not shown), regions exceeding the preset threshold temperature (for example, 40° C.) are excluded from the ROI in regions (split regions) not excluded in the maximum value comparison step.

In the adjacent region comparison step, the maximum value between the adjacent regions are compared (S250) in the regions remaining after the maximum value comparison step or the threshold temperature comparison step. Among the adjacent regions, only the region with the largest maximum value is left and the adjacent regions excluding it are excluded from the ROI (S255). In this way, the maximum value of the remaining regions among the regions that have passed the maximum value comparison step or the threshold temperature comparison step is compared, and only the region with the largest maximum value is left, and the remaining adjacent regions are excluded from the ROI (S260). In other words, it repeats the process that compares between adjacent regions with each other for all adjacent regions of ROIs, selects the region with the largest maximum value, and excludes the remaining adjacent regions excluding it.

In the image of FIG. 10, the maximum values in the adjacent regions are compared in the adjacent region comparison step. Regions with the largest maximum value is left and regions with small maximum value are excluded from the ROI. The results are shown in the image of FIG. 11.

In the maximum temperature detection step, the coordinates (i.e., XY coordinates) of the final ROI detected in the adjacent region comparison step and the maximum temperature of the corresponding region are detected (S265).

In the real and the thermal images, the maximum temperature of the corresponding region is displayed at the position of the coordinates for the final ROI detected in the maximum temperature detection step (S270). That is, the temperature value is displayed on the image.

<Histogram Equalization for Diagnostic Purposes (Win-Level Automatic Adjustment)>

This is performed by the win-level auto adjusting unit (207) of the data processing unit (200).

When mapping colors to infrared images, it is necessary to properly distribute color expressions over the entire histogram of the temperature region of interest in order to maximize diagnostic efficiency.

Since the overall histogram graph of an image has characteristics that the background region and the BSA can be divided, the area to be observed can be selected by adjusting the win-level. In the histogram, the horizontal axis is the temperature range, and the vertical axis is the cumulative amount of the number of pixels.

At adjusted win-level, the temperature distribution is determined in the interval between the minimum and maximum values. Pseudo-coloring is performed by defining the point at which the maximum temperature region becomes 3% of the total area as the maximum expression temperature, and by defining the intersection point between the background and the BSA as the minimum point. In other words, pseudo-coloring is performed according to the window level by defining the point where 3% of the total area has the maximum temperature region as the maximum expression temperature, the intersection point between the background and the BSA as the minimum expression temperature.

Figure 12:
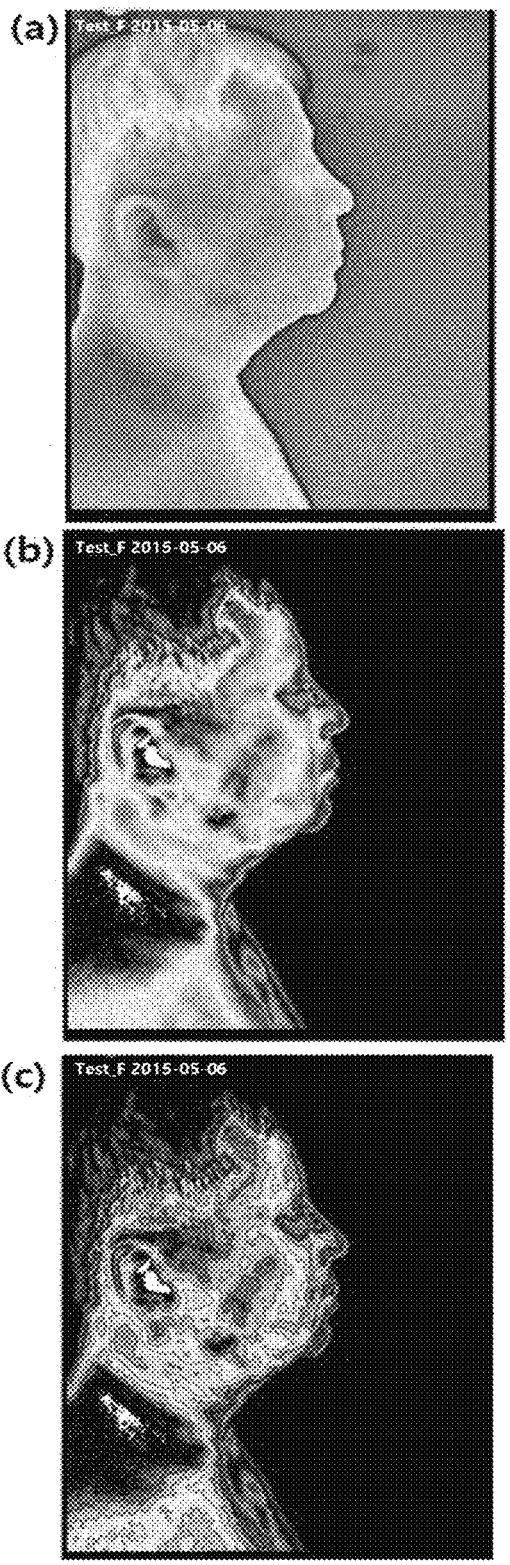
FIG. 12 shows sample images before and after the win-level adjustment.

FIG. 12 illustrates before and after the win-level adjustment.

FIG. 12(a) shows sample images before the win-level adjustment. FIG. 12(b) shows images obtained by dividing the background region and the BSA in the histogram of FIG. 12(a).

FIG. (c) shows pseudo-colored images on the images of FIG. 12(b).

Figure 13:
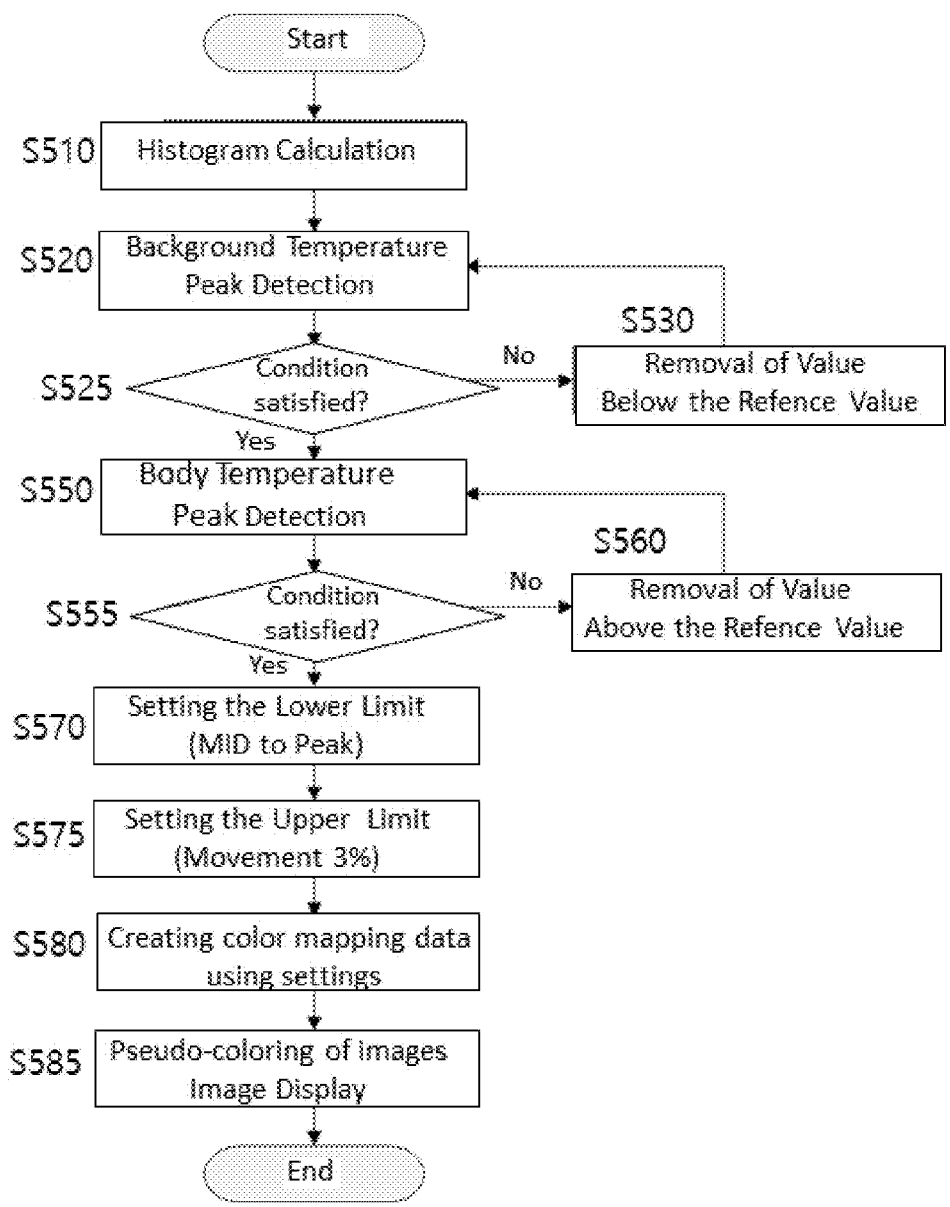
FIG. 13 is a flowchart illustrating a histogram equalization (win-level automatic adjustment) for diagnostic purposes in the present invention.
Figure 14:
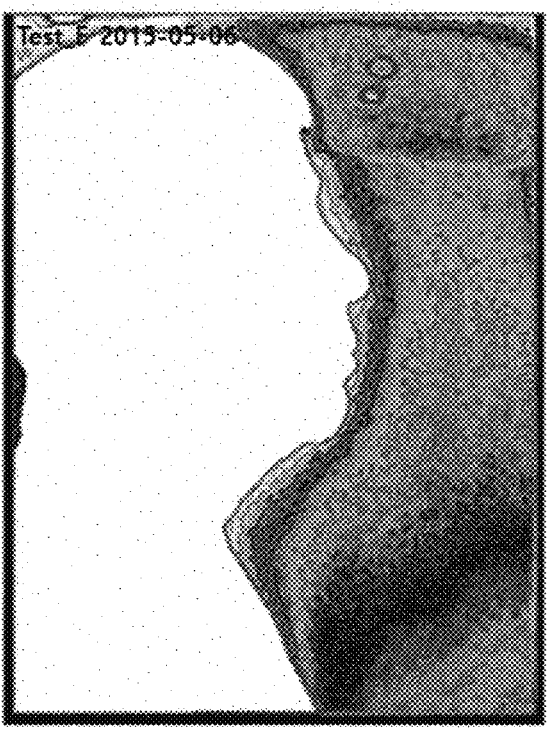
FIG. 14 shows an example of a background section and a BSA section.
Figure 14:
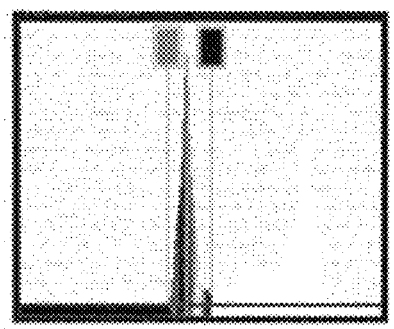
Figure 14:
Figure 14:
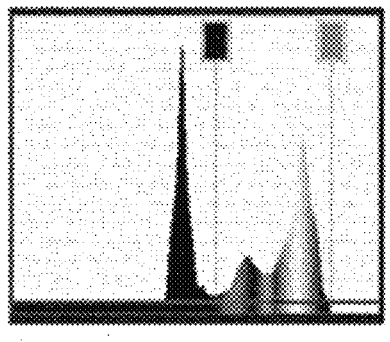
Figure 15:
FIG. 15 shows the ROI selected from the BSA of FIG. 14.
Figure 15:
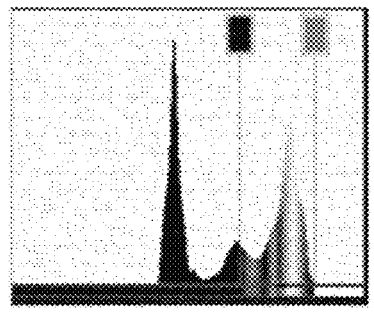
Figure 15:
Figure 15:
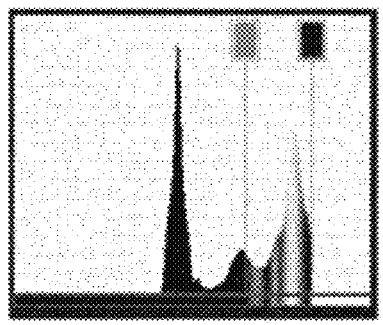

FIG. 13 is a flowchart illustrating a diagnostic histogram equalization (win-level automatic adjustment) in the present invention. FIG. 14 shows an example of the background region and BSA. FIG. 15 shows the ROI of BSA selected from the BSA of FIG. 14.

In the histogram calculation step, a histogram is calculated from the thermal image (S510).

In the background peak detection step, the background peak is detected from the histogram calculated in the histogram calculation step (S520).

In the condition test execution step of background peak, the background peak detected in the background peak detection step is checked whether it is the local peak lower than the preset background peak reference value (S525). If it is the local peak lower than the background peak reference value, this background peak is removed (S530), and the process returns to the background peak detection step.

In the BSA peak detection step, the BSA peak is detected from the histogram calculated in the histogram calculation step (S520). FIG. 14 (b) illustrates the BSA peak detected in the BSA peak detection step of FIG. 13.

In the BSA peak condition test execution step, the BSA peak detected in the BSA peak detection step is checked whether it is the local peak higher than the preset BS peak reference value (S555). If it is the local peak higher than the BSA peak reference value, this BSA peak is removed (S560), and the process returns to the BSA peak detection step. FIG. 15 shows the detected body surface area of interest in the BSA of FIG. 14 after performing the BSA peak condition test execution step.

In the lower and upper limit value set step, the points with the lower (S570) and upper (S575) limits and the values of the lower and upper limits are set. That is, the maximum temperature region becomes 3% of the total area is set as the maximum (upper limit value) expression temperature, and the intersection point between the background and the BSA is set as the minimum point (lower limit value).

In the pseudo coloring step, color mapping data is generated using the BSA peak, the background peak, and the lower and upper limit values. Pseudo-coloring of the BSA is performed (S575) using the histogram. The pseudo-coloring image performed in this way is output to the display unit (210).

In the present specification, details that can be sufficiently recognized and inferred by those of ordinary skill in the technical field of the present invention are omitted. In addition to the specific examples described in the present specification, more various modifications are possible within the scope of not changing the technical idea or essential configuration of the present invention. Accordingly, the present invention may be implemented in a manner different from that specifically described and illustrated in the present specification, which can be understood by those with ordinary knowledge and skills in the technical field of the present invention.

[Reference Signs List]

| | |
|---|---|
| 120: Thermal Imaging Camera | 130: Real Imaging Camera |
| 200: Data Processing Unit | 201: Real and Thermal Image Mapping Unit |
| 205: Multi-Region Body Temperature Detection Unit | |
| 207: Win-Level Auto Adjusting Unit | |
| 210: Display Unit | 220: Memory Unit |

The invention claimed is:

1. A body heat tester comprising:
a thermal imaging camera for taking thermal images of an area with a plurality of subjects;
a real imaging camera for taking real images of an area with a plurality of subjects at a same time as the thermal camera; and
a data processing unit that performs operations, comprising:
matching thermal and real images received from the thermal imaging camera and the real imaging camera,
obtaining reconstructed real images matched with the thermal images by stretching or shortening a top, bottom, left, and right of the real images based on the thermal images, and
detecting a body heat of subjects using the thermal images and the reconstructed real images;
wherein the data processing unit further comprises a real and thermal image mapping unit configured to:
store real image frames each at a time before and after of thermal image frames in a memory unit;

select a real image frame having a maximum matching rate with a thermal image among the stored real image frames;

detect boundaries of a subject in a thermal image frame and the selected real image frame; and match the thermal image frame with results of expanding or stretching and reducing or shortening the selected real image frame by 1 pixel in each direction of top, bottom, left and right to select a point in the real image frame with the maximum matching rate.

2. The body heat tester according to claim 1, wherein the real and thermal image mapping unit is configured to:

invert a real image screen and a thermal image screen for edge detection;

compare thermal image profiles on a horizontal axis in the inverted thermal image screen and real image profiles on the horizontal axis in the inverted real image screen;

obtain real image profiles on the horizontal axis closest to the thermal image profiles on the horizontal axis as reconstructed real image profiles on the horizontal axis;

compare the thermal image profiles on a vertical axis in the inverted thermal image screen and the real image profiles on the vertical axis in the inverted real image screen;

obtain the real image profiles on the vertical axis closest to the thermal image profiles on the vertical axis as reconstructed real image profiles on the vertical axis;

calculate a ratio and delta of the reconstructed real image profiles on the horizontal axis and the vertical axis;

adjust a ratio and position of a horizontal real image and a vertical real image with the ratio and delta value of the reconstructed real image profiles on the horizontal axis and the vertical axis to form an adjusted real image;

store the adjusted real image as a reconstructed real image in the memory unit; and output the adjusted real image to a display unit.

3. The body heat tester according to claim 2, wherein the data processing unit further comprises a multi-region body temperature detection unit configured to:

divide the thermal image and the reconstructed real image into a preset horizontal number×vertical number to form split regions;

obtain an overall mean value from a region of interest (ROI) which includes a split region of the thermal image;

exclude a split region in which a maximum value of each split region in the thermal image is less than the overall mean value from the ROI;

exclude regions in which the maximum value of each split region of the thermal image exceeds a preset threshold temperature from the ROI;

compare maximum values between adjacent split regions from the ROI;

exclude remaining adjacent regions from the ROI leaving out only a split region with a largest maximum value among the adjacent regions;

calculate coordinates of remaining split regions in the ROI and calculate a maximum temperature of the remaining split regions; and display the calculated maximum temperature on thermal image and the real images at the coordinates of the remaining split regions.

4. The body heat tester according to claim 3, wherein the data processing unit further comprises a win-level auto adjusting unit configured to:

calculate a histogram from the thermal image;

detect a background peak with a peak value higher than a reference value of the background peak in the histogram;

detect a body surface area (BSA) peak with a peak value lower than a reference value of a preset BSA peak in the histogram;

set a point at which a maximum temperature region becomes 3% of a total thermal image area as an upper limit value, which is a maximum point of expression temperature;

set a segmentation point where a background and a BSA intersect as a lower limit that is a minimum point of expression temperature, perform pseudo-coloring on the BSA in the thermal image by creating color mapping data using the lower limit and the upper limits; and output an obtained pseudo-coloring image to the display unit.

5. A method of operating a body heat tester comprising a thermal imaging camera and a real imaging camera for simultaneously detecting body heat of a plurality of subjects, comprising:

a reconstructed real image detection step, wherein a data processing unit receives a thermal image from the thermal imaging camera and a real image from the real imaging camera, and matches the thermal image and the real image by stretching or shortening a top, bottom, left, and right of the real image based on the thermal image, to obtain a reconstructed real image matching the thermal image; and a body heat detection step, wherein the data processing unit detects a body heat of the plurality of subjects using thermal images and reconstructed real images;

wherein in the reconstructed real image detection step, the data processing unit:

imports real image frames acquired at a time before/after thermal image frames based on a thermal image frame from a memory unit;

select a real image frame with a maximum matching rate with the thermal image frame among the real image frames;

detect boundaries of a subject in each of the thermal image frames and the selected real image frame; and match the thermal image frame with results of expanding or stretching and reducing or shortening the selected real image frame by 1 pixel in each direction of top, bottom, left and right to select a point with the maximum matching rate.

6. The method of operating the body heat tester according to claim 5, the reconstructed real image detection step comprising:

a screen inversion step, wherein the data processing unit inverts a real image screen and a thermal image screens for edge detection by the data processing unit;

a horizontal axis matching rate detection step, wherein the data processing unit obtains a horizontal axis matching rate by comparing horizontal axis thermal image profiles with horizontal axis real image profiles in a predetermined thermal image and a predetermined real image, inverted in the screen inversion step;

a step of comparison with a maximum matching value of a horizontal axis, wherein the data processing unit, compares the horizontal axis matching rate with a pre-stored maximum matching rate value of the horizontal axis, imports a next horizontal axis real image profile of the inverted real image from the screen inversion step, from the memory unit if the horizontal axis matching rate is not equal to the maximum matching rate value of the horizontal axis, and returns to the horizontal axis matching rate detection step;

a vertical axis matching rate detection step, wherein the data processing unit obtains a vertical axis matching rate by comparing vertical axis thermal image profiles with vertical axis real image profiles in the predetermined thermal image and the predetermined real image, inverted in the screen inversion step;

a step of comparison with a maximum matching rate value of a vertical axis, wherein the data processing unit; compares the vertical axis matching rate with a pre-stored maximum matching rate value of the vertical axis, imports a next vertical axis real image profile of the inverted real image from the screen inversion step; from the memory unit if the vertical axis matching rate is not equal to the maximum matching rate value of the vertical axis, and returns to the vertical axis matching rate detection step;

a step of storing matching data of the horizontal axis and the vertical axis, wherein the data processing unit performs the following:
  uses a horizontal axis real image profile for reconstruction if the horizontal axis matching rate is equal to the maximum matching value of the horizontal axis in the step of comparison with the maximum matching value of the horizontal axis;
  uses a vertical axis real image profile for reconstruction if the vertical axis matching rate is equal to the maximum matching rate value of the vertical axis in the step of comparison with the maximum matching value of the vertical axis; and,
  obtains a ratio and delta of the horizontal axis real image profile for reconstruction and the vertical axis real image profile for reconstruction, and stores the ratio and delta in the memory unit; and a real image adjustment step, wherein the data processing unit; adjusts position and ratio of the vertical axis real image profile and the horizontal axis real image profile with the ratio and delta value of the vertical axis real image profile and the horizontal axis real image profile for reconstruction, saves an adjusted real image as a reconstructed real image in the memory unit, and outputs the reconstructed real image to a display unit.

7. The method of operating the body heat tester according to claim 5, wherein the body heat detection step comprises:
  a region segmentation step, wherein the data processing unit divides a region of the thermal image on a screen into a preset number of horizontal dividing lines× number of vertical dividing lines to form split regions, and sets the split regions as ROIs;
  an outermost region exclusion step, wherein the data processing unit excludes outermost regions among the split regions divided in the region segmentation step;
  a mean value detection step, wherein the data processing unit calculates a mean value of the thermal image in all the split regions of the thermal image divided in the region segmentation step;
  a maximum value comparison step, wherein the data processing unit compares a maximum value of each of the split regions divided in the region segmentation step with the mean value detected in the mean value detection step, and excludes a split region in which the maximum value is less than the mean value, from the ROI;
  an adjacent region comparison step, wherein the data processing unit compares a maximum value between adjacent split regions interconnected in the ROI, and leaves only a split region a largest maximum value and excludes remaining adjacent regions; from the ROI;
  a maximum temperature detection step, wherein the data processing unit takes remaining split regions after going through the adjacent region comparison step, as a final ROI, and calculates coordinates and a maximum temperature of split regions of the final ROI;
  a step of displaying a corresponding value on the image, wherein the data processing unit displays the maximum temperature of the split regions of the final ROI on the thermal image and the real images of the coordinates of the split regions of the final ROI.

8. The method of operating the body heat tester according to claim 5, further comprising a pseudo-colored image output step after the body heat detection step, wherein the pseudo-colored image output step includes:
  a histogram calculation step, including calculating a histogram from the thermal image by the data processing unit;
  a background peak detection step, including detecting a background peak in the histogram wherein the data processing unit detects a background peak value higher than a preset background peak reference value;
  a body surface area (BSA) peak detection step, including detecting a BSA peak in the histogram wherein the data processing unit detects a peak value lower than a preset BSA peak reference value;
  a lower and upper limit value set step, wherein the data processing unit calculates as an upper limit value a point at which a maximum temperature region becomes 3% of a total area of the thermal image as a maximum expression temperature, and calculates as a lower limit value a point where a background and the BSA intersect as a minimum point, and
  a pseudo coloring step, wherein the data processing unit creates color mapping data using the lower limit value and the upper limit values obtained in the lower and upper limit value set step, performs pseudo-coloring on the BSA in the thermal image, and outputs a pseudo-colored image to a display unit.

9. The method of operating the body heat tester according to claim 6,
  wherein the horizontal axis matching rate in the horizontal axis matching rate detection step is an absolute value of a value obtained by subtracting a length of a thermal image profile and a length of real image profile on the horizontal axis, and
  wherein the vertical axis matching rate in the vertical axis matching rate detection step is an absolute value of a value obtained by subtracting the length of the thermal image profile and the length of real image profile on the vertical axis.

10. The method of operating the body heat tester according to claim 9, wherein the maximum matching value of the horizontal axis and the vertical axis is 0.

* * * * *